F. C. H. EICHORN.
AUTOMOBILE LOCK.
APPLICATION FILED JULY 2, 1919.

1,347,262.                                              Patented July 20, 1920.

Inventor,
Frederick C.H. Eichorn;
By
A. B. Upham,
Attorney.

UNITED STATES PATENT OFFICE.

FREDERICK C. H. EICHORN, OF BOSTON, MASSACHUSETTS, ASSIGNOR OF TWO-THIRDS TO JAMES W. BURKE AND ALBERT H. EICHORN, BOTH OF BOSTON, MASSACHUSETTS.

AUTOMOBILE-LOCK.

1,347,262.  Specification of Letters Patent.  Patented July 20, 1920.

Application filed July 2, 1919. Serial No. 308,628.

*To all whom it may concern:*

Be it known that I, FREDERICK C. H. EICHORN, a citizen of the United States, and residing at the city of Boston, in the county of Suffolk and Commonwealth of Massachusetts, have invented certain new and useful Improvements in Automobile-Locks, of which the following is a full, clear, and exact specification.

Attempts have been made to lock or hobble automobiles and the like by locking upon one or more of the wheels a radial projection which practically makes travel impossible.

The object of my invention is to produce a lock of this kind which cannot be turned on the rim, no matter how much the tire is deflated. Also to effect other improvements in details of construction hereinafter set forth.

To this end, I provide the tire-clasping lock with a clamp which so engages the edge of the wheel hub as to effectually prevent it from being turned.

Figure 1:
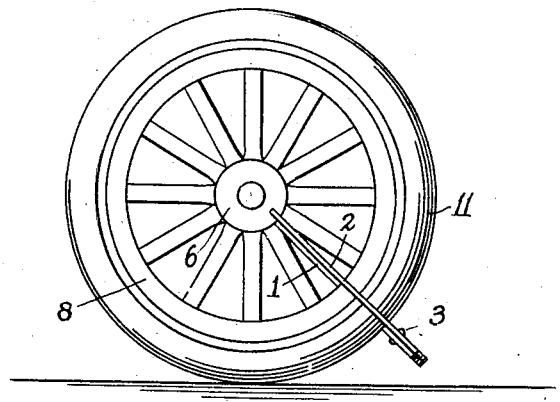
Figure 2:
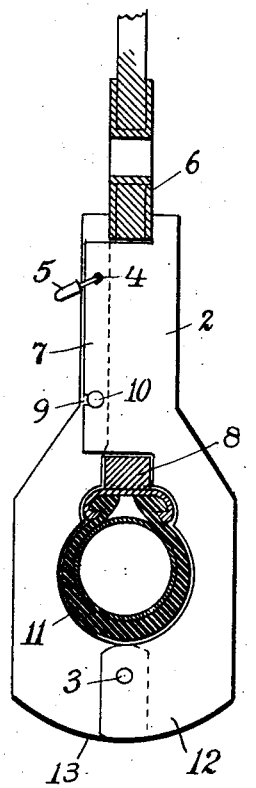
Figure 3:
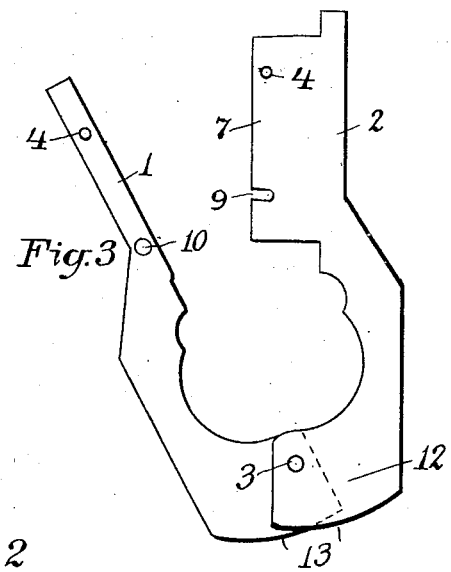

In the drawings forming part of this specification, Figure 1 is an elevation of an automobile wheel showing my improved lock mounted thereon. Fig. 2 is a sectional view of the wheel showing my lock fastened thereon. Fig. 3 is a face view of the structure with its arms open and separate from the wheel.

As shown in Fig. 3, my improved lock comprises two arms or jaws 1 and 2, pivoted together at 3, each being preferably composed of hardened sheet steel to prevent their being cut away. The adjacent edges of the two jaws are shaped to correspond with the surfaces of the wheel rim and tire, in order that, when the jaws are brought together, they will somewhat closely fit such surfaces as shown in Fig. 2.

One of the jaws, as 2, is made much wider than the other, sufficiently so to overlap the same, and each is provided with a hole 4 designed to receive the bow of a padlock 5 by which the parts are locked together.

These arms 1, 2 are made long enough to reach inward toward the axle of the wheel beyond the hub 6, as is shown in Figs. 1 and 2, so that being thus placed and the arm extension 7 being between the hub 6 and the wheel rim 8, no degree of deflation of the tire, or even its entire removal, will enable the attachment to be shifted in the slightest degree, and much less to be removed.

Further to insure the device against having its arms 1, 2 forced apart, as by prying in between them, I provide the extension 7 with a slot 9 in its edge, and the arm 1 with a button 10, as shown in Fig. 3, whereby when the arms are swung together the button will engage the slot and hold the parts together.

Thus constructed, the automobile lock will remain firmly in place and incapable of being turned no matter how much the tire 11 is deflated, and the outward extension 12 will come against the roadway with the same firmness and effectiveness as when the tire is strongly inflated.

By having the nose of the extension quite broad, as 13 in Fig. 2, it will penetrate soft ground less easily than the comparatively sharp spurs previously in use for the purpose. It sometimes happened with the latter construction that the thief would work the automobile over to the side of a country road where the locking spur could sink into the soft earth and thereby get far enough away to leisurely remove the entire wheel carrying the locking spur, and having applied a new wheel, to speed to a safe distance.

What I claim is:

1. A locking device for automobiles comprising a pair of substantially like members pivoted together and shaped to partially inclose the tire and rim of a wheel when they are swung together, each member having an extension rigid therewith adapted to reach to and past the adjacent portion of the periphery of the wheel-hub, and means for locking said members and extensions in engagement with the rim and hub, said extensions clamping the hub between them and thereby preventing the locking device from being turned on the rim and tire.

2. A locking device for automobiles and the like comprising a pair of substantially like members pivoted together at their outer ends and shaped to partially inclose the rim and tire of a wheel when they are swung together, said members having parts which overlap when swung together, the overlapping parts having holes thus brought into alinement, a locking device for engaging said holes and locking the parts together, each member having an extension rigid therewith and adapted to reach slightly past the nearest portion of the wheel hub, whereby said extensions clamp the hub between them and prevent the members from being turned upon the rim and tire.

In testimony that I claim the foregoing invention I have hereunto set my hand this 30th day of June, 1919.

FREDERICK C. H. EICHORN.